(12) United States Patent
Spencer et al.

(10) Patent No.: US 11,052,890 B2
(45) Date of Patent: Jul. 6, 2021

(54) BRAKE RESERVOIR WITH INTERNAL CONDUIT FOR INTEGRATED POWER BRAKE UNIT

(71) Applicant: Robert Bosch GmbH, Stuttgart (DE)

(72) Inventors: Scott Spencer, Milford, MI (US); David Black, Commerce, MI (US)

(73) Assignee: Robert Bosch GmbH, Stuttgart (DE)

( * ) Notice: Subject to any disclaimer, the term of this patent is extended or adjusted under 35 U.S.C. 154(b) by 345 days.

(21) Appl. No.: 16/084,171

(22) PCT Filed: Mar. 8, 2017

(86) PCT No.: PCT/EP2017/055437
§ 371 (c)(1),
(2) Date: Sep. 11, 2018

(87) PCT Pub. No.: WO2017/153470
PCT Pub. Date: Sep. 14, 2017

(65) Prior Publication Data
US 2020/0290582 A1    Sep. 17, 2020

Related U.S. Application Data

(60) Provisional application No. 62/307,022, filed on Mar. 11, 2016.

(51) Int. Cl.
*B60T 11/26* (2006.01)
*B60T 13/14* (2006.01)
*B60T 13/74* (2006.01)

(52) U.S. Cl.
CPC ............. *B60T 11/26* (2013.01); *B60T 13/142* (2013.01); *B60T 13/148* (2013.01); *B60T 13/745* (2013.01)

(58) Field of Classification Search
CPC ...... B60T 13/686; B60T 13/745; B60T 11/26; B60T 17/06; B60T 13/268; B60T 13/16
See application file for complete search history.

(56) References Cited

U.S. PATENT DOCUMENTS 3,879,947 A * 4/1975 Gaiser .................... B60T 11/26
60/535
3,948,414 A * 4/1976 Hagerty .................. B60T 11/26
220/203.02

(Continued)

FOREIGN PATENT DOCUMENTS

CN          1611404 A     5/2005
CN        102858608 A     1/2013
(Continued)

OTHER PUBLICATIONS

International Search Report corresponding to PCT Application No. PCT/EP2017/055437, dated Jun. 26, 2017 (4 pages).
(Continued)

*Primary Examiner* — Robert A. Siconolfi
*Assistant Examiner* — Mahbubur Rashid
(74) *Attorney, Agent, or Firm* — Michael Best & Friedrich LLP

(57) ABSTRACT

An integrated power brake unit (20) includes an input rod (30) operable to receive a driver braking input force, a booster operable to boost the driver braking input force, a master cylinder, a pump operable to provide pressurized fluid for braking, in lieu of the master cylinder, in response to the driver braking input force, and a fluid reservoir (36) defining a main chamber. The fluid reservoir (36) has first and second outlet ports (P1, P2) in fluid communication to supply the master cylinder, and a third outlet port (P3) in fluid communication to supply the pump, each of the first, second, and third outlet ports (P1, P2, P3) being provided in a bottom wall (48) of the fluid reservoir (36). The fluid
(Continued)

reservoir (36) includes a sub-chamber (42) within the main chamber, the sub-chamber (42) covering the third outlet port (P3), and defining an opening (56) to the main chamber at a forward-most end of the sub-chamber (42).

17 Claims, 5 Drawing Sheets

(56) References Cited

U.S. PATENT DOCUMENTS

| | | | | | |
|---|---|---|---|---|---|
| 4,414,810 | A | * | 11/1983 | Reinartz | B60T 11/26 60/535 |
| 4,488,404 | A | * | 12/1984 | Arakawa | B60T 17/225 220/501 |
| 4,502,281 | A | * | 3/1985 | Arakawa | F16D 25/12 60/585 |
| 4,505,113 | A | * | 3/1985 | Reinartz | B60T 17/225 60/535 |
| 4,665,702 | A | * | 5/1987 | Vatter | B60T 11/26 60/592 |
| 5,957,545 | A | * | 9/1999 | Sawada | B60T 11/26 303/1 |
| 6,913,040 | B2 | * | 7/2005 | Crossman | B01D 29/117 137/587 |
| 6,984,000 | B2 | * | 1/2006 | Fraisse | B60T 8/4081 188/345 |
| 7,980,075 | B2 | * | 7/2011 | Sato | B60T 11/26 60/592 |
| 8,607,563 | B2 | * | 12/2013 | Takahashi | B60T 11/26 60/592 |
| 8,813,560 | B2 | | 8/2014 | Neumann et al. | |
| 8,899,039 | B2 | * | 12/2014 | Mouri | B60T 11/26 60/585 |
| 2002/0005041 | A1 | * | 1/2002 | Shinohara | B60T 17/06 60/585 |
| 2005/0062343 | A1 | * | 3/2005 | Hayashi | B60T 17/06 303/1 |
| 2006/0017320 | A1 | * | 1/2006 | Hayashi | B60T 11/26 303/85 |
| 2008/0256948 | A1 | * | 10/2008 | Sato | B60T 11/26 60/592 |
| 2011/0265469 | A1 | * | 11/2011 | Mouri | B60T 11/26 60/592 |
| 2014/0225425 | A1 | * | 8/2014 | Drumm | B60T 13/146 303/9.75 |
| 2016/0236664 | A1 | * | 8/2016 | Aoki | B60T 13/142 |
| 2016/0251006 | A1 | * | 9/2016 | Koshimizu | B60T 17/06 206/459.1 |
| 2016/0272178 | A1 | * | 9/2016 | Feigel | B60T 8/4081 |

FOREIGN PATENT DOCUMENTS

| | | | | |
|---|---|---|---|---|
| DE | 28 24 789 | A1 | | 2/1980 |
| DE | 2834789 | A1 | * | 2/1980 |
| DE | 19738334 | A1 | * | 3/1998 ............ B60T 11/26 |
| DE | 19958193 | A1 | * | 6/2001 ............ B60T 17/225 |
| DE | 103 46 236 | A1 | | 1/2005 |
| DE | 102007035840 | A1 | * | 9/2008 ............ F16D 48/02 |
| EP | 1 441 939 | A1 | | 8/2004 |
| EP | 1570890 | A1 | * | 9/2005 ......... B01D 21/0012 |
| GB | 2111621 | A | * | 7/1983 ............ B60T 11/26 |
| JP | H05-005643 | U | | 1/1993 |
| JP | H05-032207 | U | | 4/1993 |
| JP | 2008-149801 | A | | 7/2008 |
| JP | 2013-095290 | A | | 5/2013 |

OTHER PUBLICATIONS

English translation of Notice of Reasons for Rejection in corresponding Japanese Patent Application No. 2018-544517, dated Aug. 28, 2019 (5 pages).

Translation of the Search Report issued by the National Intellectual Property Administration, P.R. China, dated Mar. 28, 2020 (3 pages).

* cited by examiner

BRAKE RESERVOIR WITH INTERNAL CONDUIT FOR INTEGRATED POWER BRAKE UNIT

CROSS-REFERENCE TO RELATED APPLICATIONS

This application is a 35 U.S.C. § 371 National Stage Application of PCT/EP2017/055437, filed on Mar. 8, 2017, which claims the benefit of priority to U.S. Provisional Patent Application No. 62/307,022, filed Mar. 11, 2016, the contents of which are incorporated by reference herein.

BACKGROUND

The present invention relates to vehicle braking systems, and more particularly to a fluid reservoir construction for an integrated power brake unit (IPB).

SUMMARY

In one aspect, the invention provides an integrated power brake unit, including an input rod operable to receive a driver braking input force, a booster operable to boost the driver braking input force, a master cylinder, a pump operable to provide pressurized fluid for braking, in lieu of the master cylinder, in response to the driver braking input force, and a fluid reservoir defining a main chamber. The fluid reservoir has first and second outlet ports in fluid communication to supply the master cylinder, and a third outlet port in fluid communication to supply the pump, each of the first, second, and third outlet ports being provided in a bottom wall of the fluid reservoir. The fluid reservoir includes a sub-chamber within the main chamber, the sub-chamber covering the third outlet port, and defining an opening to the main chamber at a forward-most end of the sub-chamber.

In another aspect, the invention provides a brake fluid reservoir for a vehicle. The brake fluid reservoir includes an outer shell defining a main chamber for containing a quantity of brake fluid for one or more vehicle brake circuits, a cap attachable to an opening in an upper wall of the outer shell to close the main chamber from the surrounding environment, and an outlet port provided on a bottom wall of the outer shell. An enclosed sub-chamber is defined within the main chamber and directly surrounding the outlet port. An opening between the sub-chamber and the main chamber is spaced forwardly of the outlet port to maintain unbroken fluid communication between the main chamber and the sub-chamber directly surrounding the outlet port in a condition in which fluid volume in the main chamber covers the opening but does not cover the outlet port.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
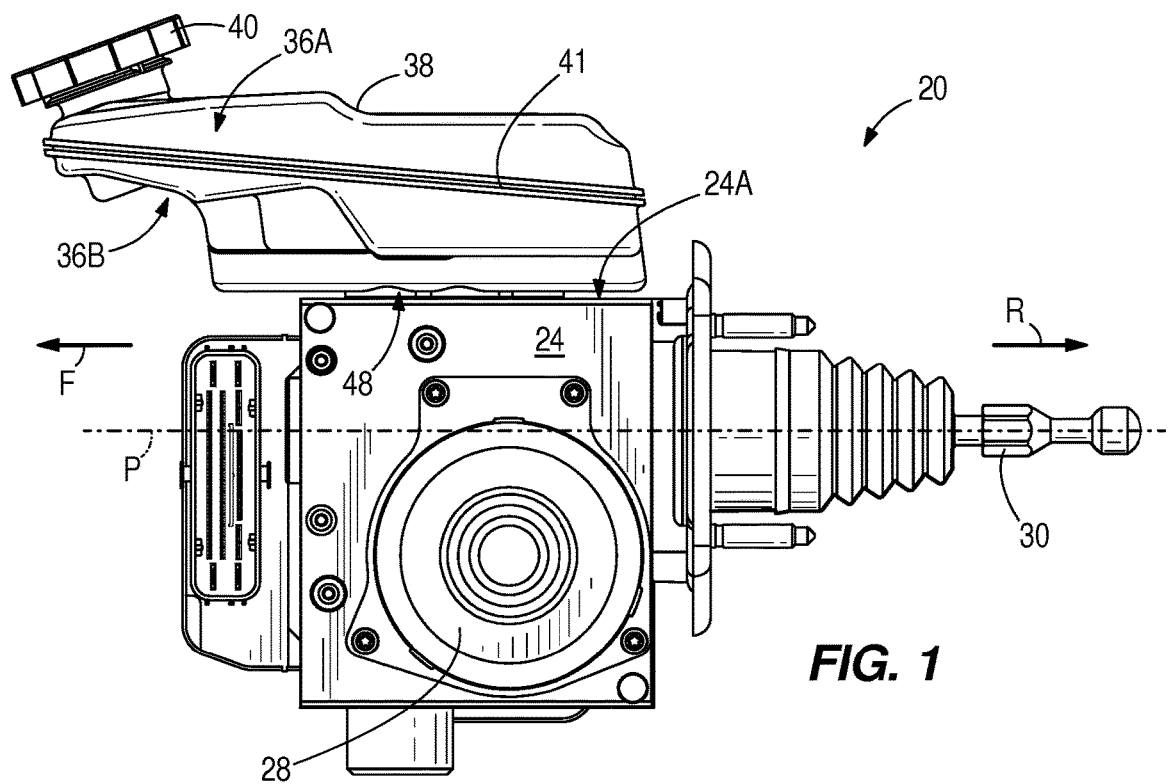
FIG. 1 is a side view of an integrated power brake unit having a reservoir according to one embodiment of the invention.
Figure 2:
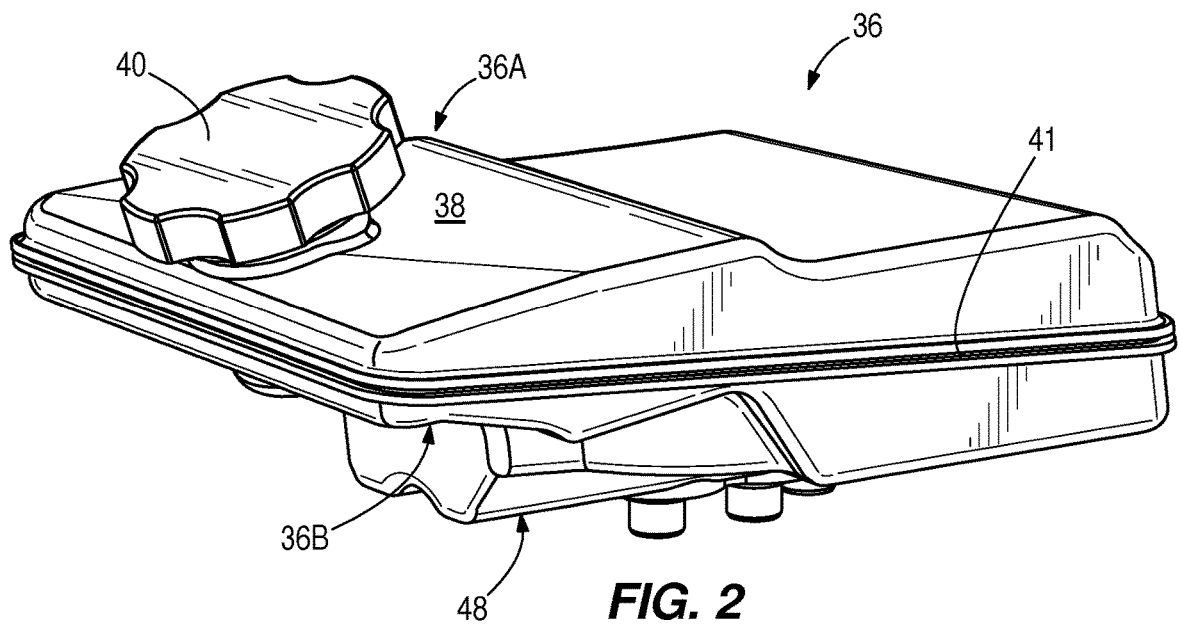
FIG. 2 is a perspective view of the reservoir of FIG. 1.

An integrated power brake unit 20 is shown in FIG. 1. The IPB unit 20 includes a housing or block 24 that contains both a brake booster (e.g., an electromechanical booster) and a brake master cylinder with outlet ports for supplying pressurized brake fluid to one or more brake circuits that contain one or more wheel cylinders to apply braking force to a wheel (e.g., squeezing a brake disc fixed to the wheel). The IPB unit 20 further includes an electronic controller coupled to a series of electronically-controlled valves inside the block 24, programmed to carry out anti-lock braking (ABS) performance strategy and/or electronic stability control (ESC) strategy. An electric motor 28 is coupled to the block 24 and has an output inside the block 24 operable to run at least one pump to generate a flow of pressurized brake fluid.

The IPB unit 20 has a defined orientation for mounting within a vehicle as defined by a brake input rod 30 that extends in a rearward direction R. The IPB unit 20 is mounted in the engine bay or under-hood area of the vehicle near or on the dash wall, with the brake input rod 30 extending toward a cabin space of the vehicle so that the brake input rod 30 is coupled to a driver-actuated brake pedal (not shown). Opposite the rearward direction R is a forward direction F, which is consistent with a normal forward travel direction of the vehicle. Although the brake input rod 30 of the IPB unit 20 is operable to mechanically generate a hydraulic braking force to the brake circuits upon depression of the vehicle brake pedal, the IPB unit 20 can operate in a full decoupled or brake-by-wire (BBW) mode in which braking force is generated by an electromechanical device (e.g., a motor-driven pump) that delivers fluid into the brake circuits with electronic pressure control (e.g., via an electronically-controlled pressure control valve), without utilizing pressure generated in the master cylinder by the brake input rod 30. Thus, mechanical force from the brake input rod 30 to activate the master cylinder is only provided as an emergency back-up. The IPB unit 20 can also function to provide non-driver-directed braking, or "active" braking, such as the case with adaptive cruise control or autonomous emergency braking in response to one or more types of vehicle sensors.

Adjacent a top side of the IPB unit 20 is a brake fluid reservoir 36 operable to store a quantity of hydraulic brake fluid to ensure that the braking circuits have a reserve quantity of fluid to draw from during braking operations. The reservoir 36, particularly an outer shell of the reservoir 36, defines a reservoir chamber and includes an upper portion 38 with a fill opening normally closed by a reservoir cap 40. As illustrated, the reservoir 36 includes upper and lower portions bonded together at a peripheral seam 41. Furthermore, the reservoir 36 has a shape, dictated by specific vehicle packaging constraints, that has a relatively low height at the rearward side, and a relatively high height at the forward side. The respective heights can be measured upwardly, orthogonal to a top surface 24A of the block 24, or alternately measured upwardly from a plane P in which the brake input rod 30 is located. The plane P is horizontal as illustrated in FIG. 1. It is noted that, in addition to forward and rearward directions F, R, the IPB unit 20 has a defined orientation with respect to top and bottom, in which the reservoir 36 is positioned atop and is coupled to the top surface 24A of the block 24 (a so-called "top-mount" reservoir). The forward-most portion of the reservoir 36 can define an upper shelf portion 36A of the chamber. The upper shelf portion 36A has a bottom surface 36B positioned at a height above a bottom wall 48 of the reservoir 36 where the reservoir 36 connects to the block 24, and the master cylinder therein.

Figure 5:
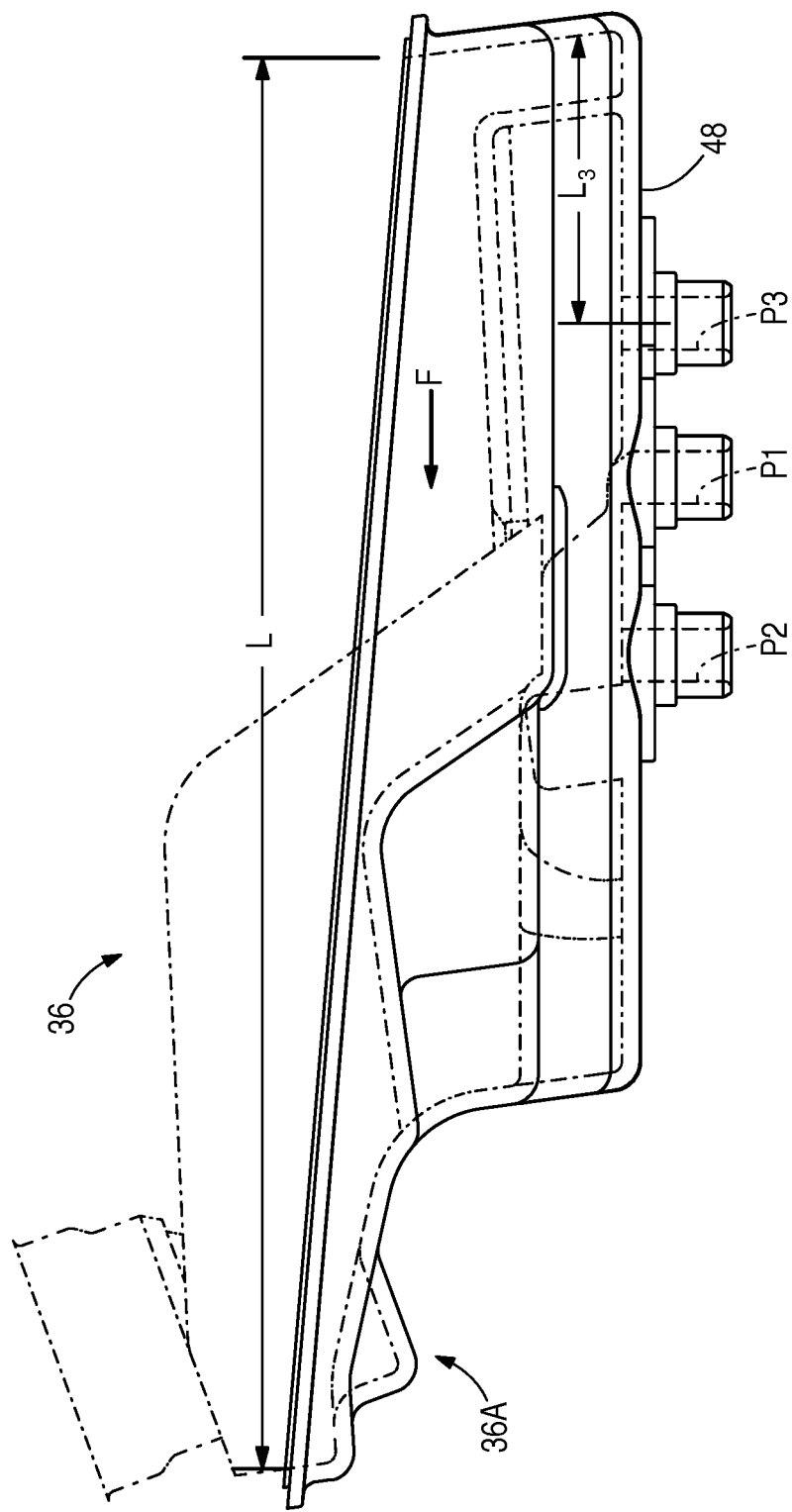
FIG. 5 is a side view of the reservoir, illustrating the fluid distribution therein at a predetermined maximum vehicle deceleration value.

As shown in FIG. 5, the bottom wall 48 of the reservoir 36 is provided with one or more outlet ports P1, P2 corresponding to respective master cylinder inlet ports. An additional outlet port, or "active port" P3, is separately provided in the bottom wall 48 of the reservoir 36 for connection to an active braking inlet port of the block 24. During normal operation in which the IPB unit 20 provides brake-by-wire braking, fluid drawn into the block 24 by the motor-driven pump for braking is drawn in through the active port P3. This is indicative of an open system (or "open circuit") configuration where the active boosting circuit and stability controlled circuit is always in fluid communication with the reservoir 36, as opposed to a closed system configuration (or "closed circuit") in which the reservoir and the circuit are fluidly isolated when activated in its normal operation. Non-limiting, detailed examples of braking systems with an open circuit configuration can be found in U.S. Pat. No. 9,315,182. During operation of the vehicle, it is important to ensure that inlets into the block 24 are continuously bathed in fluid to prevent air from being entrained and introducing compressibility to the braking circuits. This is normally achieved by the design of the reservoir 36 and the placement of the reservoir outlet ports P1, P2, P3 to ensure that the reservoir outlet ports P1, P2, P3 cannot lose fluid coverage at any point during an established set of design parameters, which can include maximum design vehicle deceleration. However, with increased packaging constraints placed on the reservoir 36, this proves to be increasingly difficult.

The reservoir 36 of FIGS. 1-6 includes a sub-chamber 42 within the reservoir chamber that improves the condition of port coverage with brake fluid in adverse vehicle maneuvers, ensuring that the active port P3 remains continuously bathed in fluid, even in circumstances of maximum vehicle deceleration, which tends to shift all the fluid in the reservoir 36 in the forward direction F, or cresting a hill at high speed, which tends to shift all the fluid in the reservoir 36 upward. With the shape factor of the reservoir 36 as shown, a typical automobile will be able to decelerate and maintain a force that will send the brake fluid in the reservoir 36 towards the forward direction F to a degree that, without the sub-chamber 42, would break fluid coverage of at least the active port P3, which is the rearmost of the reservoir outlet ports. The sub-chamber 42 ensures that, under all driving conditions, including maximum design deceleration of the vehicle, the active port P3 has access to a predefined volume charge of fluid.

The addition of the sub-chamber 42 allows for sufficient brake fluid depth at the active port P3, so as to minimize or eliminate the risk of air intake during adverse maneuvers. The sub-chamber 42 can define a volume that is at least great enough to supply a full circuit charge. For example, in some constructions the sub-chamber 42 can define a volume of at least 20 cc and not more than 30 cc (e.g., 25 cc in one exemplary embodiment). The addition of the sub-chamber 42 accomplishes these objectives without requiring the active port P3 to be located in a central or forward portion of the reservoir 36. In fact, the active port P3 can be located in the rear third of, or even the rear fifth of, a longitudinal reservoir length L as measured front-to-rear (see FIG. 5). In other words, the length $L_3$ from a rear edge of the reservoir main chamber to the active port P3 can be one-third or less than the length L of the reservoir main chamber, and in some cases $L_3$ is one-fifth or less than the length L of the reservoir main chamber. The brake fluid reservoir 36 can be made from polypropylene and constructed of two halves that are high temperature welded so that leakage during brake system filing and normal usage is avoided. The sub-chamber 42 in the lower half of the reservoir 36 is implemented by another weld or bonding operation prior to bringing the top and bottom halves together for the final weld operation.

Figure 3:
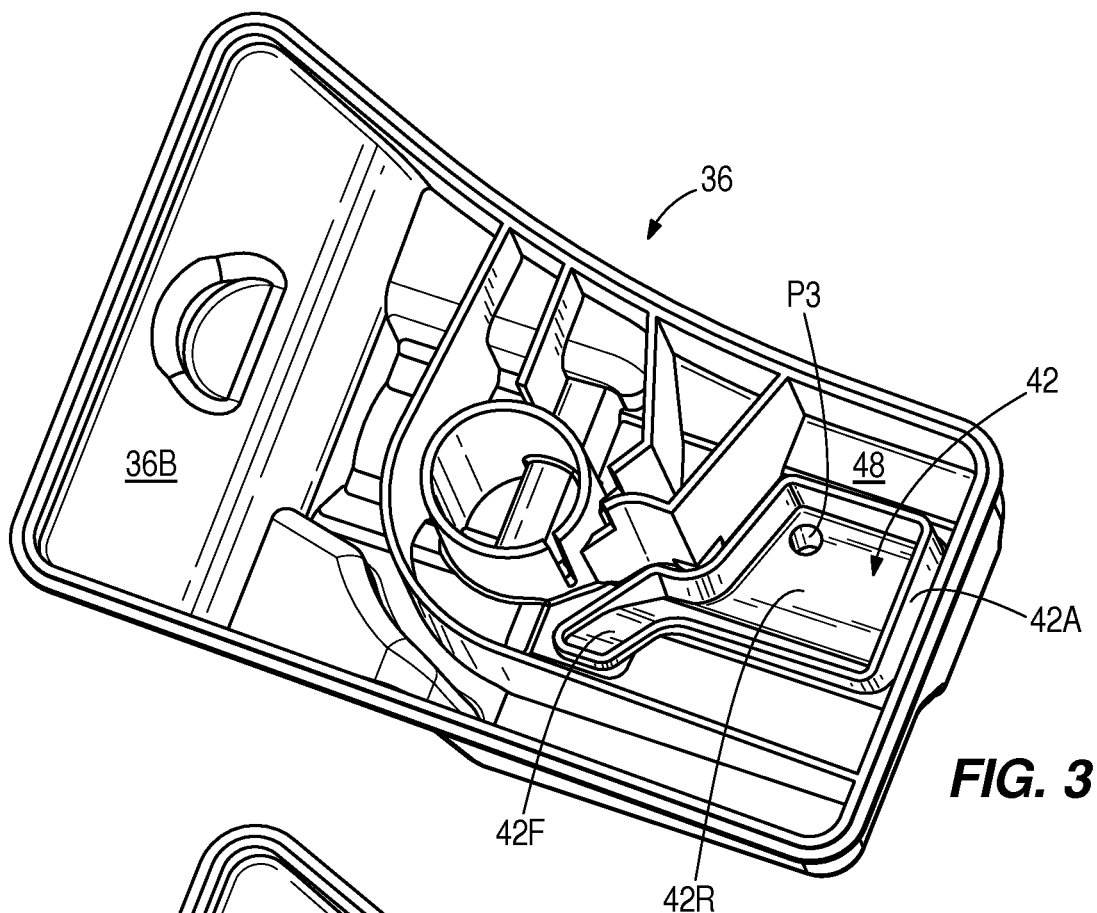
FIG. 3 is a perspective view of a lower portion of the reservoir, illustrating vertical walls defining a sub-chamber therein.
Figure 4:
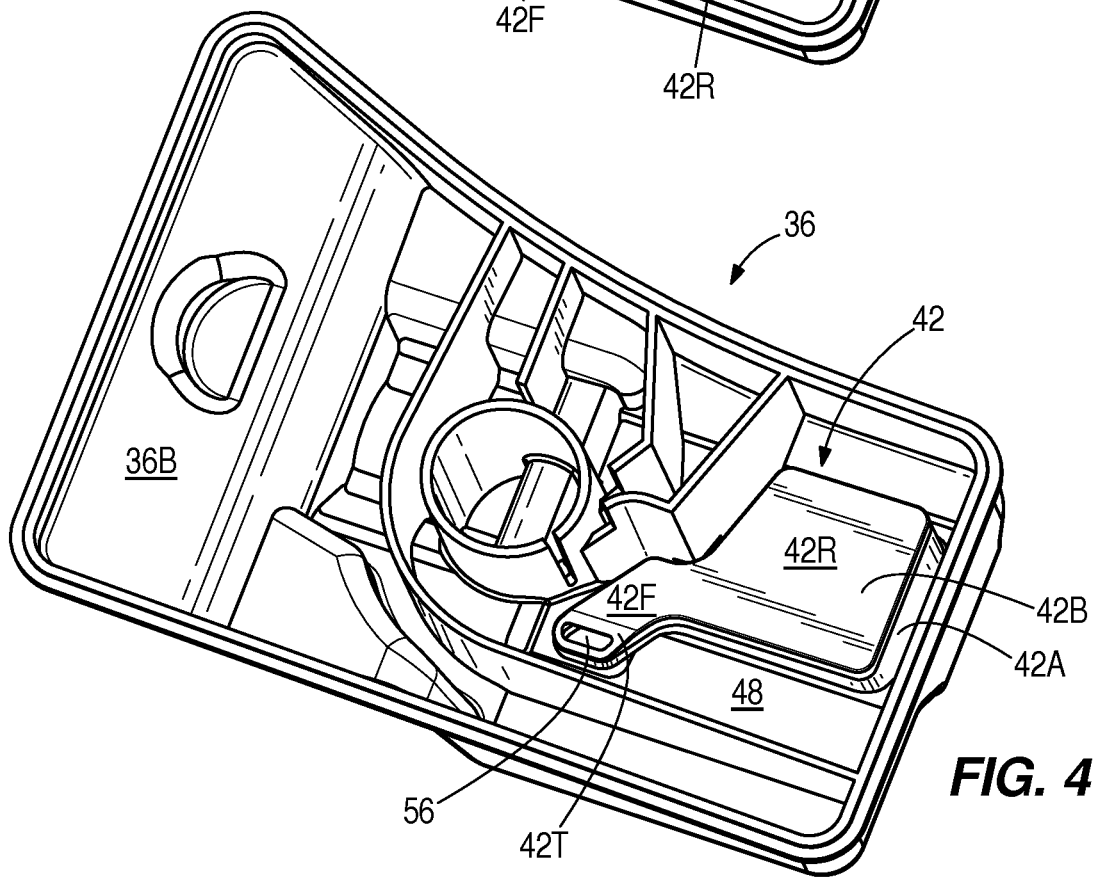
FIG. 4 is a perspective view of the lower portion of the reservoir, illustrating the internal conduit having a cap coupled to the vertical walls to enclose the sub-chamber.

The sub-chamber 42 can be formed by one or more upstanding walls 42A extending upward from the bottom wall 48 as shown in FIG. 3. The walls 42A can be integrally-formed (e.g., by a common molding process) with the bottom wall 48 in some constructions, eliminating the need to bond the upstanding walls 42A to the bottom wall 48. The sub-chamber 42 can further be enclosed on a top side by a cover 42B as shown in FIG. 4 (the cover 42B is removed in FIG. 3 to illustrate the interior of the sub-chamber 42. The cover 42B can be bonded or welded to the top edge of the upstanding walls 42A to seal the sub-chamber 42 from the surrounding volume of the reservoir 36. In particular, the sub-chamber 42 can be completely enclosed and sealed from the reservoir chamber except for a small opening 56 provided at a forward end 42F of the sub-chamber 42. As illustrated, the opening 56 is provided in the cover 42B. The opening 56 is positioned at a central portion of the reservoir chamber as measured front-to-rear.

As illustrated in FIGS. 3 and 4, the sub-chamber 42 is formed in two sections, including a main or major portion 42R that is located rearward of the opening 56 and that defines a majority of the sub-chamber volume and directly surrounds the active port P3. The other section of the sub-chamber 42 is a stem portion 42F extending forwardly from the rearward major portion 43R and including the opening 56 at its forward-most end. In the illustrated construction, the stem portion 42F extends both forwardly and laterally from the major portion 42R. The opening 56 can be provided at a height above the active port P3, which is provided at the bottom of the rearward major portion 42R of the sub-chamber 42. However, the opening 56 can be provided in a downwardly-tapered section 42T of the cover 42B. The opening 56 can be positioned directly adjacent in height to the bottom wall 48 of the reservoir 36 so that flow between the main reservoir chamber and the sub-chamber 42 is largely unobstructed. This can be accomplished by providing the downwardly-tapered section 42T and the opening 56 adjacent an area of the bottom wall 48 that is higher than that where the rearward major portion 42R of the sub-chamber 42 is located. As can be seen in FIG. 3, the bottom wall 48 cascades downwardly from the forward stem portion 42F to the rearward major portion 42R of the sub-chamber 42. In fact, the upstanding walls 42A that define the perimeter of the sub-chamber 42 may have little or no protrusion from the bottom wall 48 at the forwardmost end of the stem portion 42F as the bottom wall 48 and the sub-chamber walls 42A merge closely together at a common height.

Figure 6:
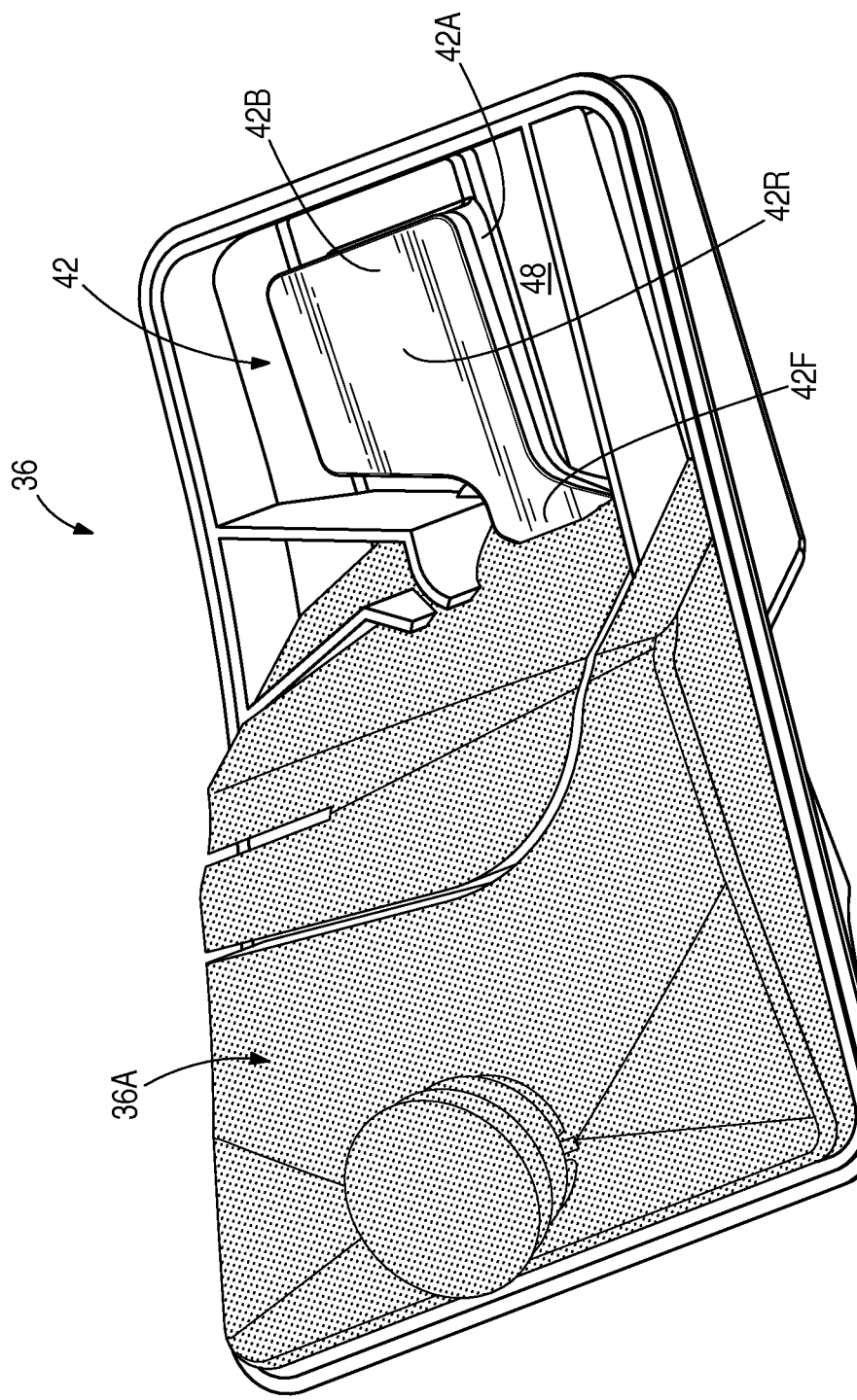
FIG. 6 is a perspective view of the reservoir, illustrating the fluid distribution therein at the predetermined maximum vehicle deceleration value.

The sub-chamber 42 serves as an extension of the active port P3 that extends closer to the center of the reservoir 36 to provide more coverage of brake fluid during adverse vehicle maneuvers where the fluid rushes to one side or the other. An example of brake fluid movement within the reservoir 36 during a maximum braking deceleration maneuver is shown in FIGS. 5 and 6. It is noted that this deceleration may correspond to a vehicle design criteria that may take into account the vehicle's original equipment braking equipment, and maximum available grip between the vehicle's original equipment tires and a dry road surface. It can be observed that the opening 56 remains fully covered in brake fluid despite the overall forward shift of the bulk brake fluid. Although not completely shown, for the purpose of highlighting the fluid in the sub-chamber 42, fluid coverage can also be maintained over both the outlet ports P1, P2 to the master cylinder.

The IPB unit 20 is designed to place the reservoir 36 in very close proximity to the dash. As a result, the available vertical package space for a reservoir design within a given vehicle application is significantly reduced. The addition of the sub-chamber 42 in the reservoir 36 allows for the active port P3 to be fully covered with brake fluid at all times during normal operation of the vehicle. Without the sub-chamber 42, it would be nearly impossible to implement a top-mounted reservoir solution with the packaging constraints of the reservoir 36 as shown.

Figure 7:
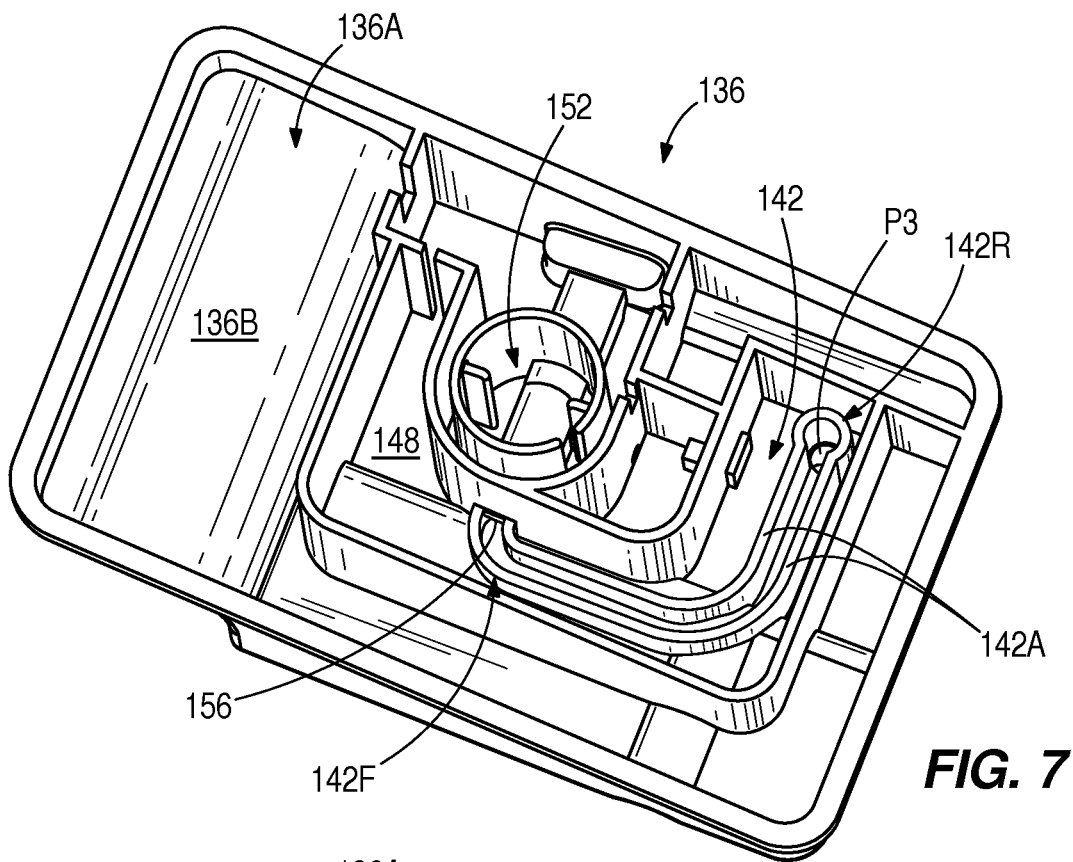
FIG. 7 is a perspective view of a lower portion of a reservoir of a first alternate construction, illustrating vertical walls defining a sub-chamber therein.
Figure 8:
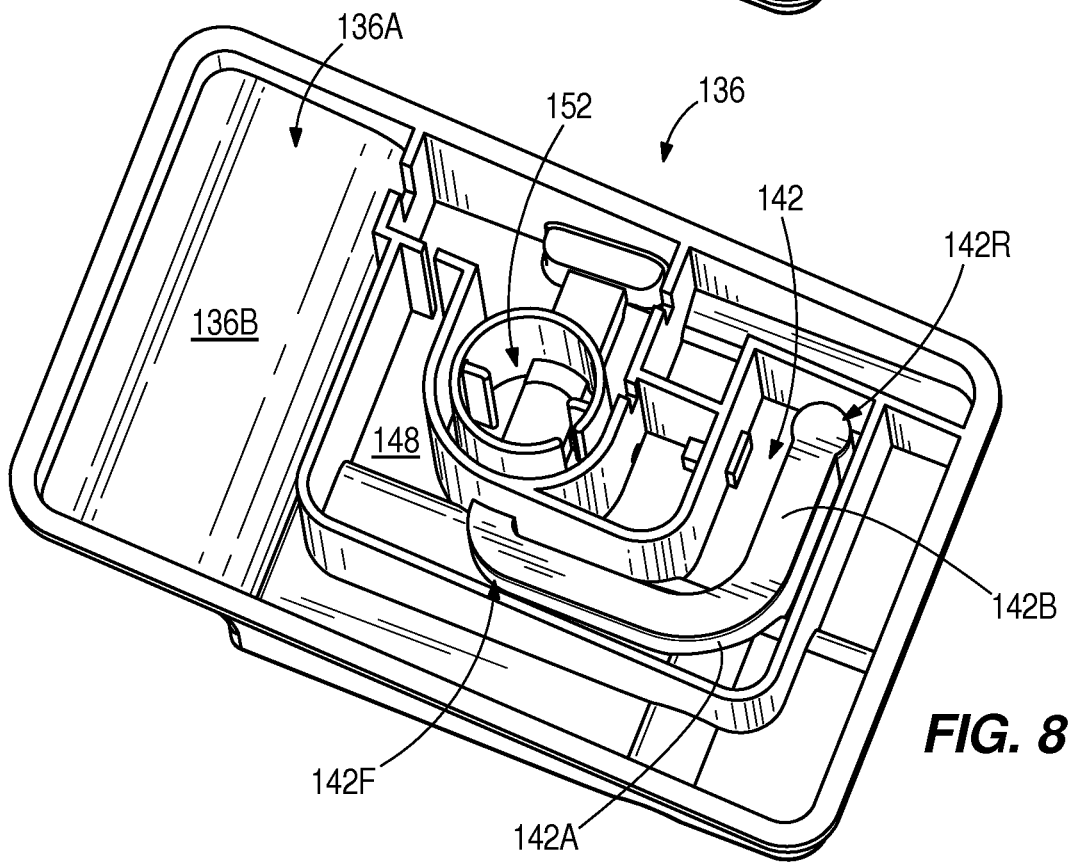
FIG. 8 is a perspective view of the lower portion of the reservoir of FIG. 7, illustrating the sub-chamber having a cap coupled to the vertical walls to enclose the sub-chamber.

FIGS. 7 and 8 illustrate an alternate reservoir 136 that can be used with the IPB 20 or a similar unit. Though not necessarily required in all embodiments, the reservoir 136 of FIGS. 7 and 8 includes, similar to the reservoir 36 of FIGS. 1-6, a forward-most portion that defines an upper shelf portion 136A having a bottom surface 136B positioned at a height above a bottom wall 148 of the reservoir 136. Although provided in a different shape, a sub-chamber 142 is provided to surround the active port P3 as in the embodiment of FIGS. 1-6. The sub-chamber 142 is formed as a directed channel that includes a series of upstanding walls 142A arranged generally in an "L" shape, having two straight segments connected by a curved connection segment. The active port P3 is positioned at a rearward end 142R of the sub-chamber 142, opposite a forward end 142F. Although removed for clarity in FIG. 7, a cover 142B is bonded or welded to the top edge of the walls 142A to seal the sub-chamber 142. Thus, the sub-chamber 142 can be enclosed on four sides including top, bottom and both lateral sides along the entire length between its forward and rearward ends 142F, 142R. The sub-chamber 142 is only open to the main reservoir chamber at an opening 156 provided at the forward end 142F. The opening 156 is positioned at a central portion of the reservoir chamber as measured front-to-rear. The opening 156 can be formed in a wall extending up from the reservoir bottom wall 148 to define a level sensor sub-chamber 152 that receives a float assembly operable to indicate brake fluid level within the reservoir (i.e., required for dash warning light activation).

As described above, each of the sub-chambers 42, 142 is provided to encompass the active outlet port P3 through which fluid communication, in an open system configuration, from the reservoir chamber to an active circuit is maintained during active braking. However, a sub-chamber as disclosed herein may be provided within a traditional master cylinder where fluid coverage at the reservoir ports into the master cylinder chambers is desired, and the proximity to the level sensor sub-chamber requires an enclosed volume that precludes the possibility for air intrusion into the system during extreme conditions where fluid moves in the main reservoir chamber.

What is claimed is:

1. An integrated power brake unit comprising:
   an input rod operable to receive a driver braking input force;
   a booster operable to boost the driver braking input force;
   a master cylinder;
   a pump operable to provide pressurized fluid for braking, in lieu of the master cylinder, in response to the driver braking input force; and
   a fluid reservoir defining a main chamber, the fluid reservoir having first and second outlet ports in fluid communication to supply the master cylinder, and a third outlet port in fluid communication to supply the pump, each of the first, second, and third outlet ports being provided in a bottom wall of the fluid reservoir, wherein the fluid reservoir includes a sub-chamber within the main chamber, the sub-chamber covering the third outlet port, and defining an opening to the main chamber at a forward-most end of the sub-chamber, wherein the sub-chamber is formed of a forward stem portion and a rearward major portion, wherein the rearward major portion defines a majority volume of the sub-chamber and directly surrounds the third outlet port, and wherein the opening to the main chamber of the fluid reservoir is defined in the stem portion.

2. The integrated power brake unit of claim 1, wherein the booster is an electromechanical booster.

3. The integrated power brake unit of claim 1, wherein the third outlet port is positioned rearward of the first and second outlet ports.

4. The integrated power brake unit of claim 1, wherein the third outlet port is positioned in the rear third of reservoir length as measured front-to-rear.

5. The integrated power brake unit of claim 1, wherein the third outlet port is positioned in the rear fifth of reservoir length as measured front-to-rear.

6. The integrated power brake unit of claim 1, wherein, within the sub-chamber, the bottom wall cascades downwardly from the forward stem portion to the rearward main portion of the sub-chamber.

7. The integrated power brake unit of claim 1, wherein the sub-chamber includes a plurality of upstanding walls extending from the bottom wall and a cover sealingly fitted to the plurality of upstanding walls, wherein the opening to the main chamber of the fluid reservoir is defined in the cover.

8. The integrated power brake unit of claim 7, wherein the opening to the main chamber of the fluid reservoir is defined in a downwardly tapered section of the cover.

9. The integrated power brake unit of claim 1, wherein the sub-chamber includes a plurality of upstanding walls integrally formed with the bottom wall to extend upwardly therefrom, and a cover sealingly fitted to the plurality of upstanding walls.

10. The integrated power brake unit of claim 1, wherein the sub-chamber encloses neither of the first and second outlet ports.

11. A brake fluid reservoir for a vehicle, the brake fluid reservoir comprising:

an outer shell defining a main chamber for containing a quantity of brake fluid for one or more vehicle brake circuits;

a cap attachable to an opening in an upper wall of the outer shell to close the main chamber from the surrounding environment;

master cylinder outlet ports provided on a bottom wall of the outer shell;

an active outlet port provided on the bottom wall of the outer shell separate from and spaced from the master cylinder ports toward a rear end of the brake fluid reservoir; and an enclosed sub-chamber defined within the main chamber and directly surrounding the active outlet port, wherein an opening between the sub-chamber and the main chamber is spaced forwardly of the active outlet port to maintain unbroken fluid communication between the main chamber and the sub-chamber directly surrounding the active outlet port in a condition in which fluid volume in the main chamber is shifted forward to a degree that, without the sub-chamber, would break fluid coverage of the active outlet port, wherein the sub-chamber is formed of a forward stem portion and a rearward major portion, wherein the rearward major portion defines a majority volume of the sub-chamber and directly surrounds the active outlet port, and wherein the opening to the main chamber of the fluid reservoir is defined in the stem portion.

12. The brake fluid reservoir of claim 11, wherein the active outlet port is positioned in the rear third of reservoir length as measured front-to-rear.

13. The brake fluid reservoir of claim 11, wherein the active outlet port is positioned in the rear fifth of reservoir length as measured front-to-rear.

14. The brake fluid reservoir of claim 11, wherein, within the sub-chamber, the bottom wall cascades downwardly from the forward stem portion to the rearward main portion of the sub-chamber.

15. The brake fluid reservoir of claim 11, wherein the sub-chamber includes a plurality of upstanding walls extending from the bottom wall and a cover sealingly fitted to the plurality of upstanding walls, wherein the opening to the main chamber of the fluid reservoir is defined in the cover.

16. The brake fluid reservoir of claim 15, wherein the opening to the main chamber of the fluid reservoir is defined in a downwardly tapered section of the cover.

17. The brake fluid reservoir of claim 11, wherein the sub-chamber includes a plurality of upstanding walls integrally formed with the bottom wall to extend upwardly therefrom, and a cover sealingly fitted to the plurality of upstanding walls.

* * * * *